Patented Oct. 10, 1922.

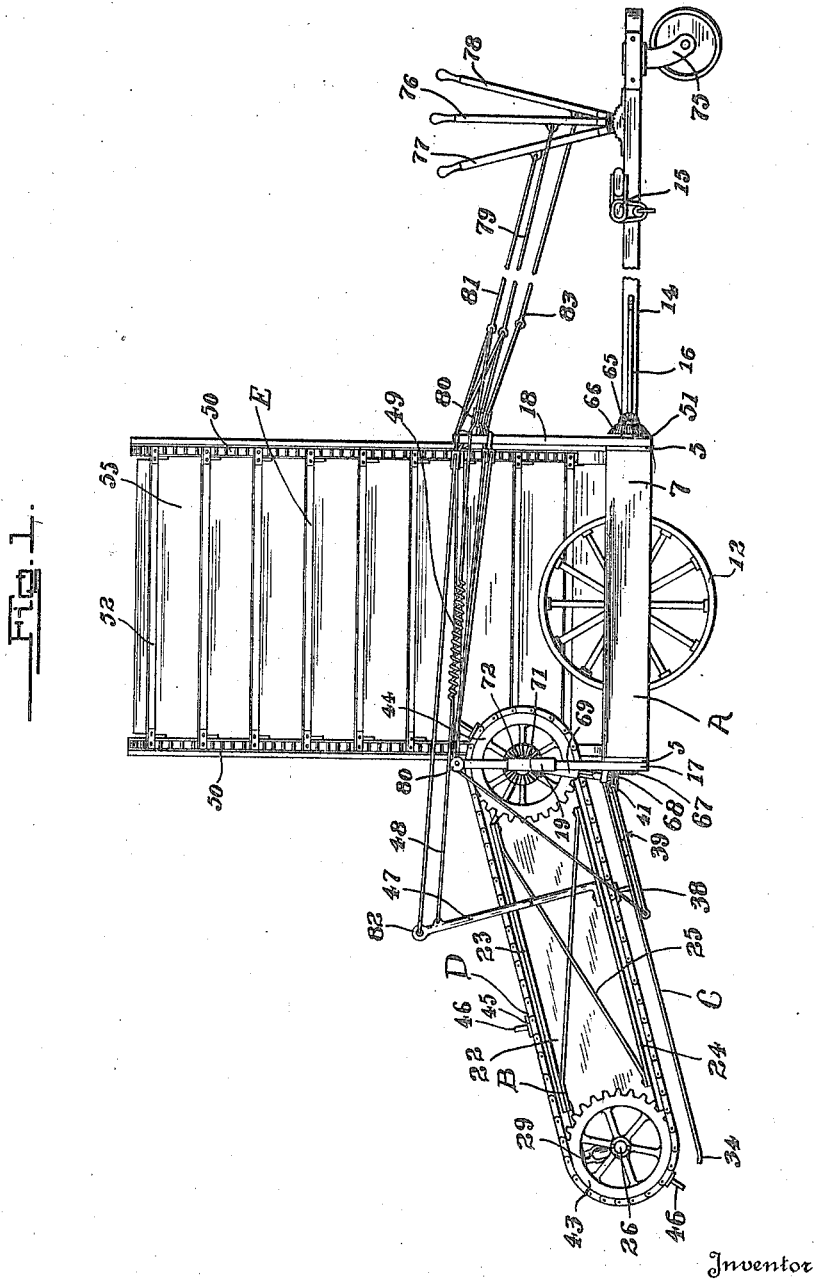

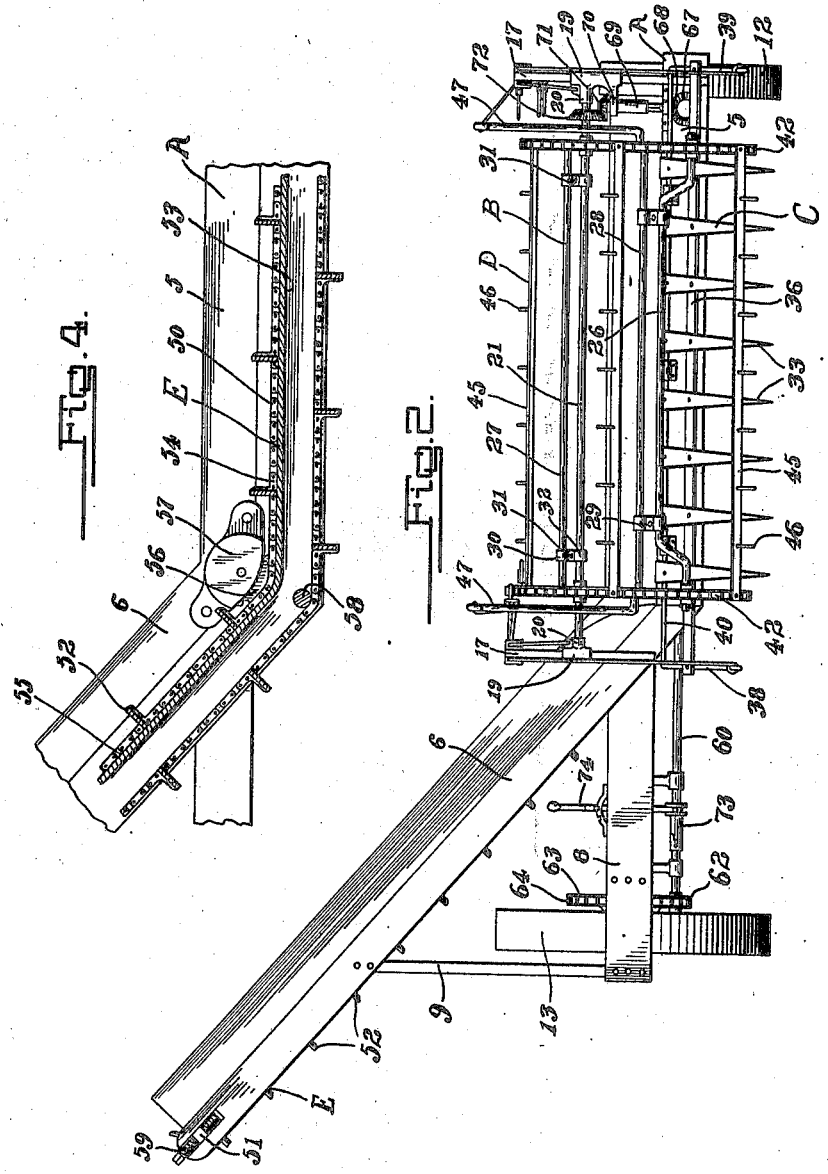

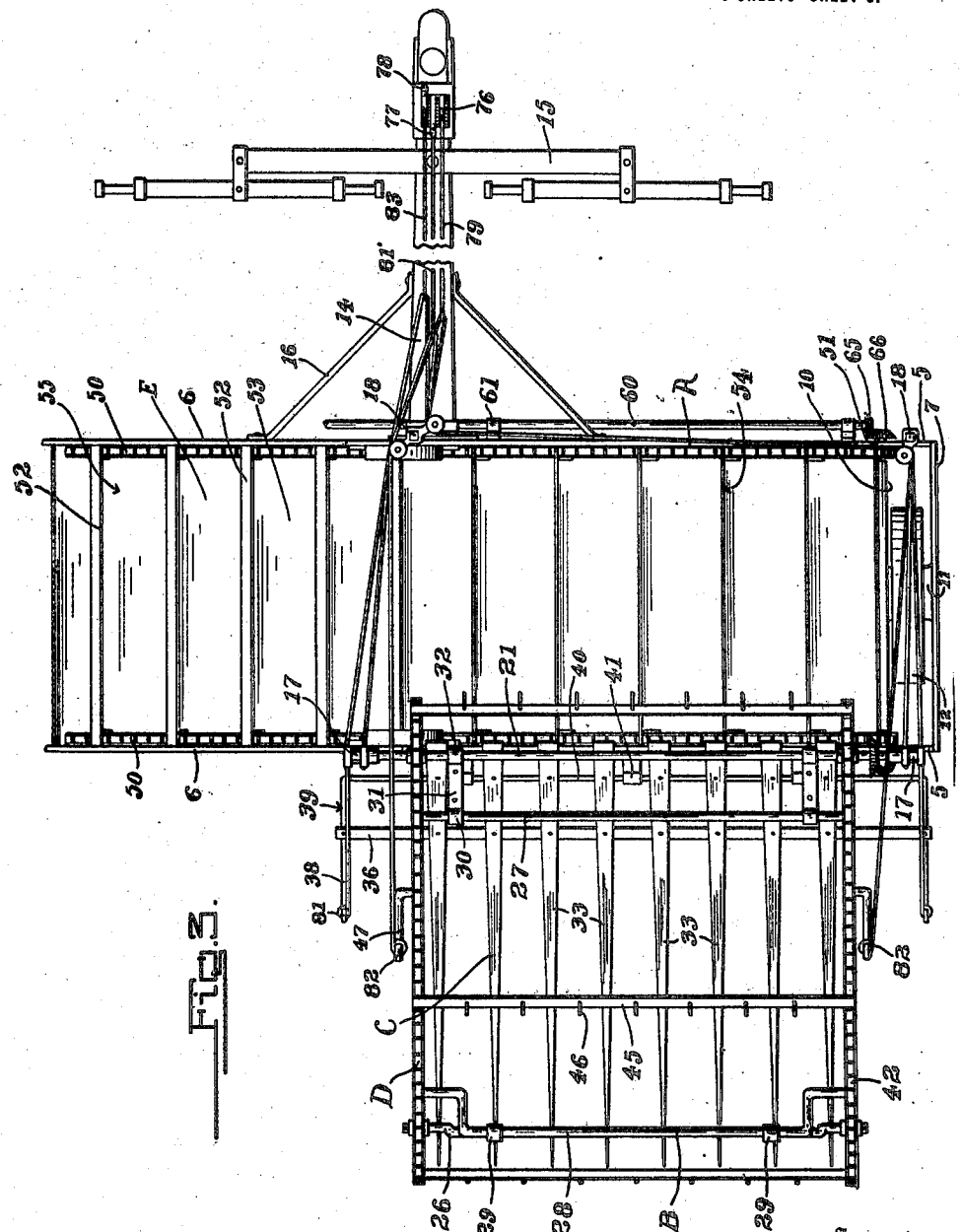

1,431,640

UNITED STATES PATENT OFFICE.

HUGH R. ENNIS, OF JOPLIN, MONTANA.

SHOCK AND HAY LOADER.

Application filed January 4, 1921. Serial No. 434,936.

*To all whom it may concern:*

Be it known that I, HUGH R. ENNIS, a citizen of the United States, residing at Joplin, in the county of Liberty and State of Montana, have invented certain new and useful Improvements in Shock and Hay Loaders, of which the following is a specification.

This invention relates to loaders of the type utilized for agricultural purposes, and the primary objects of the invention are to provide in a device for loading hay, flax, shocks of grain or the like direct from the field to suitable barges or other vehicles, an improved means for gathering the hay or other material being loaded upon the rake or toothed pick up frame and directing the same to the laterally extending elevating conveyor, an improved means for adjusting the material gathering member in relation to the pick up frame, said means permitting the material gatherer to be adjusted at a height and angle in relation to the pick up frame, means for adjusting the pick up frame in relation to the ground, and means for moving the gatherer and a pick up frame to an inoperative position in relation to the ground when the device is being moved to or from a field.

Another object of the invention is to provide a novel means for arranging the pick up frame and material gatherer in relation to the laterally extending conveyor and to provide a simple and novel means for connecting the material gatherer and the laterally extending conveyor.

A still further object of the invention is to provide an improved loader of the above character which will be durable and efficient in use, one that will be simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which:

Figure 1 is a side elevation of the improved shock and hay loader.

Figure 2 is a front elevation of the same.

Figure 3 is a top plan view of the improved loader, and

Figure 4 is an enlarged fragmentary longitudinal section through a portion of the loader, illustrating the means for changing the angle of the laterally extending conveyor, so as to permit the material to be elevated to a vehicle body.

Referring to the drawings in detail, wherein similar reference characters designate corresponding parts throughout the several views, the letter A indicates the main frame, B, the forwardly extending supplemental frame, C the pick up frame, D, the material gatherer or reel for the pick up frame and E the laterally extending conveyor.

The main frame A comprises a pair of spaced laterally extending sides 5 which are disposed in a horizontal plane, the upwardly and laterally extending side beams or bars 6 and the end beam 7 secured to the side beams or bars 5. The side beams 5 may be braced in any suitable manner as well as the upwardly and laterally extending side beams 6. At a point above the side beams 5, the laterally extending side beams 6 have secured thereto horizontally disposed laterally extending side beams 8. These beams 8 are also reinforced in any preferred manner and have secured to their terminals upwardly extending standards 9 which form supports for the upwardly and laterally extending side beams 6. The side beams 5 have secured thereto the transversely extending beam 10 which is arranged in parallel relation to the end beam 7, and the beams 7 and 10 support a stub axle 11 upon which is mounted a ground supporting wheel 12. The outer end of the spaced laterally extending horizontally disposed side beams 8 also support a stub axle upon which is rotatably mounted the relatively large bull wheel 13 which formed the driving means for the material gatherer or reel D and the laterally extending conveyor. A rearwardly extending tongue or beam 14 is carried by the main frame A and has secured thereto a suitable draft gear 15 whereby draft animals may be secured to the device. Thus it can be seen that the hay or shock loader is pushed across a field similar to an ordinary header. The beam or tongue 14 is suitably braced by means of bracing members 16. A pair of upwardly extending vertically disposed standards 17 are secured to the forward portion of the frame and a pair of upwardly extending spaced standards 18 are carried by the rear portion of the frame A in parallel relation to the front pair of standards 17. The front standards 17 are arranged in direct horizontal alignment and have slidably mounted thereon slide blocks 19 and these slide blocks 19 have suitable bearings 20 in which is rotatably mounted a longitudinally extending shaft 21. This shaft 21 forms the drive means for the material gatherer D and the support for the forwardly extending supplemental frame B. The forwardly extending supplemental frame B comprises a pair of spaced side boards 22. The side frames are braced by side frames 23 which include spaced upper and lower bars 24 and cross diagonal boards 25. The side bars 22 support forwardly and rearwardly extending bearings which receive the front rotatable shaft 26 and the rear stationary shaft 27. The forwardly positioned shaft 26 is carried by substantially U-shaped transversely extending bar 28 the terminals of which are suitably secured to the side boards 22 and the frame work 25. Depending brackets 29 are utilized for connecting the shaft 26 with the transversely extending bar 28. The rear shaft 27 is rotatably mounted in a pair of bearings 30 which are attached to forwardly extending brackets 31 which are in turn rotatably mounted as at 32 upon the transversely extending operating shaft 21. This frame work constitutes the means for supporting the material gatherer D which will be hereinafter more specifically described and this frame is positioned directly above the pick up mechanism C which will now be described.

The pick up frame C comprises a plurality of spaced teeth 33 which are pointed at their forward ends. The teeth 33 are formed relatively broad and the pointed terminals thereof are slightly upturned as at 34 for forming a bearing surface for engagement against the ground. These teeth are braced by a transversely extending bar 36, the terminals of which project beyond the side end of the frame B. This transversely extending bar 36 has secured to its terminals the forwardly extending arms 38 of a U-shaped shaft 39, the bight portion 40 of which is rotatably mounted in suitable forwardly extending bearings 41 which are secured to the main frame A. As clearly shown in the drawings, the pick up frame C is arranged at an angle to the horizontal and is adapted to pick up the hay or other material being loaded as the machine is pushed across a field. This frame C is adapted to be adjusted in relation to the ground and to be moved to an inoperative position when the machine is being moved to and from a field, by means which will be hereinafter more fully described.

The material gatherer or reel D comprises a pair of spaced endless sprocket chains 42 which are trained about a forwardly disposed pair of sprocket wheels 43 and about a pair of rearwardly disposed sprocket wheels 44. The sprocket wheels 43 are secured upon the shaft 26 while the sprocket wheels 44 are mounted upon the shaft 21. These spaced endless sprocket chains 42 have secured thereto at spaced points transversely extending slats 45 which carry outwardly extending teeth 46. It can be seen that when the sprocket wheels are driven in a direction so as to cause the lower run of the endless sprocket chain 42 to move in a rearward direction, the teeth 46 will catch the material being loaded and draw the same up upon the pick up frame C and then rearwardly and off of the same, to the laterally extending conveyor E. It is also to be noted, at this point, that by raising and lowering the slide blocks 19 upon the forwardly positioned vertically disposed standards 17 that the height of the material gatherer may be adjusted in relation to the pick up frame C. It is also to be noted that by swinging the frame on the shaft 21 by means of the brackets 41 the angle of the material gatherer may also be varied in relation to the pick up frame C. In order to facilitate the changing of the angle of the material gatherer D, upwardly extending side standards or bars 47 are secured to the side frames 25 and these standards extend above the upper surface of the material gatherer. In order to support the forwardly extending supplemental frame B, and the material gatherer D, cables 48 are secured to the standards 47 and to the rearwardly disposed upwardly extending standards 18. Suitable tension springs 49 are disposed in the length of the cable 48 so that the angle of inclination of the material gatherer may be varied without changing the active length of the supporting cables 48 and the means for changing the angle of inclination of the material gatherer will be hereinafter more specifically described.

The material gatherer D is formed relatively longer than the pick up frame C so that the terminals thereof will extend forwardly and rearwardly of the same.

The laterally extending conveyor E is adapted to receive the material from the pick up frame C and is disposed below the gatherer mechanism D. This laterally extending conveyor E comprises a pair of endless sprocket chains 50, which are trained around suitable sprocket wheels carried by the shafts 51. These shafts 51 are rotatably mounted in suitable bearings carried by the outer terminals of the side beams 5 and the side beams 6. The shaft 51 is carried by the side beams 5 forms a power shaft for the conveyor E and is adapted to be driven from the bull wheel 13 as will be hereinafter more specifically described. The endless sprocket chains 50 are connected at a plurality of spaced points by transversely extending flights 52 which form means for catching the material so as to convey the same to the desired place or vehicle. The side beams 5 and 6 also support a table 53 on which the upper run of the laterally extending conveyor E is adapted to rest and this table 53 forms a positive support for the material being conveyed. As clearly shown in the drawings, the conveyor E is arranged between the side bars 5 and 6 and is arranged, as to form a horizontal run or conveyor 54 and an inclined run or conveyor 55. In order to change the direction of travel of the laterally extending conveyor E, side sprocket wheels 56 are rotatably carried at the point of connection of the side bars 5 and 6 and these sprocket wheels engage the sprocket chains and are mounted in suitable guards 57. These sprocket wheels 56 form the guides for the upper run of the laterally extending conveyor and a transversely extending roller 58 provided by the lower run. The laterally extending conveyor E extends slightly beyond the side bars 6 so as to insure the dumping of the material outwardly of the side bars and it is to be understood that a suitable barge or other vehicle is adapted to be driven alongside of the loader so as to receive the material gathered from the conveyor. In order to take up the slack in the laterally extending conveyor E, the supporting shaft 51 carried by the side beam 6 is supported by suitable rotatable adjusting screws 59 and it can be seen that by adjusting these screws, the shaft 51 may be raised or lowered.

In order to operate the material gatherer D and the laterally extending conveyor E, a drive shaft 60 is provided which is arranged in parallel relation to the side beams 5. This shaft 60 is rotatably mounted in suitable bearings 61 carried by the rearmost side beam 5. The end of the shaft 60 adjacent to the bull wheel 13 is provided with a sprocket wheel 62 which is in correct alignment with a sprocket wheel 63 carried by the bull wheel. A sprocket or other drive chain 64 is trained around the sprocket chain 62 and 63 and it can be seen that upon rotation of the bull wheel, the shaft 60 will be driven therewith. The end of the shaft 60 adjacent to the ground supporting wheel 12 is provided with a suitable bevelled gear wheel 65 which meshes with a bevelled gear wheel 66 which is keyed to the shaft 51 which is carried by the side beams 5. Thus it can be seen that as the machine is moved over the ground the laterally extending conveyor E will be operated. In order to bring about the operation of the material gatherer D, the forward end of the shaft 51 carried by the side beams 5 is provided with a bevelled gear wheel 67 which meshes with a bevelled gear wheel 68 carried by the lower end of a telescopic shaft 69. This shaft 69 is carried by suitable bearings 70 formed on one of the slide blocks 19. The upper end of the telescopic shaft 70 is provided with a bevelled gear wheel 71 which in turn meshes with a bevelled gear wheel 72 carried by the transversely extending shaft 21. Thus it can be seen that the shaft 21 is driven from the shaft 51 carried by the side beam and thus when the machine is pushed along the ground, the shaft 21 will be rotated and consequently operate the material gatherer D. In order to stop the operation of the material gatherer D and the laterally extending conveyor E, when the machine is driven to or from a field, a suitable clutch 73 is interposed in the shaft 60 and while the clutch section is provided with an operating lever 74. This lever 74 may be held in any preferred adjusted position by suitable segmental rack and pawl mechanism. The rear end of the supporting tongue or beam 14 is provided with a caster wheel 75 and the operator's platform is adapted to be placed upon the rear end of this beam. This beam has secured adjacent to the driver's platform, a plurality of operating levers 76, 77 and 78. These levers are adapted to be locked in any preferred adjusted position by means of segmental racks and pawl mechanism. The lever 76 which is utilized for adjusting the angle of the pick up mechanism C or for moving the same to an inoperative position has secured thereto suitable cables 79, which are trained around guide pulleys 80 carried by the front and rear pairs of standards 17 and 18. The forward ends of these cables 79 are in turn connected as at 81 to the extreme outer end of the arms 38 of the U-shaped supporting member 39. Thus it can be seen that by adjusting the lever 76, the pick up structure will be raised and lowered, the bearings 41 acting as the pivot point thereof. The lever 77 is utilized for changing the angle of the frame B and the material gatherer D and has connected thereto suitable cables 81, which are also trained about pulleys 80 carried by the front and rear standards 17 and 18. The forward ends of these cables 81 are connected to the extreme upper ends of the arms 47 as at 82. Thus it can be seen that by adjusting the lever 77, the frame and the material gatherer D will be caused to swing on the shaft 21 as a pivot, owing to the means of connecting the frame B and the gatherer D thereto.

The lever 78 is utilized for adjusting the height of the material gatherer and frame to the pick up structure D and this is brought about by raising and lowering the slide blocks 19. The lever 78 is connected by means of cables 83 to the slide blocks 19, as clearly shown, and these cables 83 are also trained around suitable guide pulleys.

If the material to be gathered is not bound in shocks or sheaves the lever 78 is adjusted so as to lower the slide blocks 19 and thus position the gatherer D in close proximity to the pick up frame C, after which the machine is driven to the field. The clutch lever 73 is then operated so as to cause the operation of the shaft 60 which in turn will operate the material gatherer D and the elevator E. The gatherer D is so arranged as to force the material upon the pick up structure C and push the same rearwardly on the horizontal run or portion of the conveyor E. The conveyor E then carries the material laterally and elevates the same owing to the upwardly extending inclined portion 55 thereof, and the material is then caught as the same drops from the conveyor in suitable barges or other vehicles.

When the machine is not in use and being carried over the road or to and from a field, the levers 76 and 77 are operated, so as to move the pick up frame C and the material gatherer D out of the way and above the ground level.

From the foregoing description, it can be seen that an exceptionally simple and durable loader has been provided which can be adjusted so as to handle different kinds of material, such as loose hay, flax, or shocks of grain or the like.

Changes in details may be made without departing from the spirit or scope of this invention; but,

I claim:

1. A loader comprising a supporting frame, a pick up frame carried by the supporting frame, a conveyor carried by the supporting frame arranged to receive material from the pick up frame, a gatherer mechanism arranged to cooperate with the pick up frame, and means for adjusting the height and the angle of inclination of the gatherer mechanism independently in relation to the supporting frame and pick up frame.

2. A loader comprising a wheeled supporting frame, a pick up frame pivotally carried by the forward end of the supporting frame including a plurality of toothed bars, a conveyor, an elevator carried by the supporting frame arranged to receive materials from the pick up frame, means for raising and lowering the pick up frame on said pivot connecting means, and an endless gatherer mechanism arranged above the pick up frame for forcing material thereon and for carrying material up the pick up frame to the conveyor and elevator, and means slidably connecting the gatherer mechanism to the supporting frame.

3. A loader comprising a supporting frame, a pick up frame carried by the supporting frame and arranged forwardly thereof and including a plurality of toothed bars, a conveyor and elevator carried by the supporting frame arranged to project laterally thereof, a gatherer mechanism arranged to cooperate with the pick up frame for forcing material thereon and for carrying materials up the same to said elevator and conveyor, and means slidably and pivotally connecting the gatherer mechanism with the supporting frame.

4. A loader comprising a wheeled supporting frame, a pick up frame including a plurality of toothed bars pivotally carried by the supporting frame arranged forwardly thereof, a gatherer mechanism arranged above the pick up frame including a pair of endless chains and connecting cross slats, means for raising and lowering the gatherer mechanism, and means independent of the raising and lowering means for adjusting the angle of inclination thereof in relation to the supporting frame and pick up frame.

5. A loader comprising a wheeled supporting frame, a rearwardly extending tongue carried by the supporting frame, draft mechanism carried by the tongue, a plurality of operating levers carried by the tongue, a laterally extending conveyor and elevator carried by the supporting frame, a forwardly extending pivoted pick up frame carried by the supporting frame, a forwardly extending gatherer mechanism slidably and pivotally carried by the supporting frame and arranged in superposed relation to the pick up frame, and means operatively connecting the levers to the pick up frame, and adjusting means for the gatherer mechanism and the sliding means for the gatherer mechanism.

HUGH R. ENNIS.